(12) United States Patent
Wang et al.

(10) Patent No.: US 12,034,634 B2
(45) Date of Patent: Jul. 9, 2024

(54) INFORMATION PROCESSING METHOD, NODE, AND COMPUTER-READABLE STORAGE MEDIUM

(71) Applicant: XI'AN ZHONGXING NEW SOFTWARE CO., LTD., Xi'an (CN)

(72) Inventors: Yubao Wang, Shenzhen (CN); Ran Chen, Shenzhen (CN); Dongmei Liu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 18/254,238

(22) PCT Filed: Sep. 29, 2021

(86) PCT No.: PCT/CN2021/121761
§ 371 (c)(1),
(2) Date: May 24, 2023

(87) PCT Pub. No.: WO2022/127284
PCT Pub. Date: Jun. 23, 2022

(65) Prior Publication Data
US 2024/0007394 A1 Jan. 4, 2024

(30) Foreign Application Priority Data
Dec. 15, 2020 (CN) .......................... 202011479889.8

(51) Int. Cl.
*G06F 15/173* (2006.01)
*H04L 45/00* (2022.01)
*H04L 45/28* (2022.01)

(52) U.S. Cl.
CPC .............. *H04L 45/28* (2013.01); *H04L 45/22* (2013.01); *H04L 45/32* (2013.01); *H04L 45/66* (2013.01)

(58) Field of Classification Search
CPC ......... H04L 45/28; H04L 45/22; H04L 45/32; H04L 45/66
See application file for complete search history.

(56) References Cited

U.S. PATENT DOCUMENTS

| 2009/0010171 A1 | 1/2009 | Gupta et al. |
| 2010/0246388 A1 | 9/2010 | Gupta et al. |

(Continued)

FOREIGN PATENT DOCUMENTS

| CN | 110391951 A | 10/2019 |
| CN | 111277482 A | 6/2020 |
| CN | 111935013 A | 11/2020 |

OTHER PUBLICATIONS

International Searching Authority. International Search Report and Written Opinion for PCT Application No. PCT/CN2021/121761 and English translation, dated Dec. 29, 2021, pp. 1-9.

(Continued)

*Primary Examiner* — Joseph R Maniwang
(74) *Attorney, Agent, or Firm* — Vivacqua Crane, PLLC

(57) ABSTRACT

An information processing method, a node, and a computer-readable storage medium are disclosed. The information processing method is applied to a first device sharing a dual-homing relationship with a second device. The first device is provided with a first sub-interface, while the second device is provided with a second sub-interface corresponding to the first sub-interface. The method may include in response to determining that the second sub-interface is in a failed state and a main interface to which the second sub-interface belongs is in a normal state, advertising first routing information corresponding to the first sub-interface in a network, such that a third device is configured to send a data message to the first sub-interface according to the first routing information.

20 Claims, 3 Drawing Sheets when it is determined that the second sub-interface is in a failed state and a main interface to which the second sub-interface belongs is in a normal state, advertise first routing information corresponding to the first sub-interface in a network, such that a third device sends a data message to the first sub-interface according to the first routing information — S100

(56) References Cited

U.S. PATENT DOCUMENTS

| | | |
|---|---|---|
| 2017/0288948 A1 | 10/2017 | Singh et al. |
| 2017/0344594 A1* | 11/2017 | Lindem, III .......... G06F 16/275 |
| 2018/0077050 A1* | 3/2018 | Tiruveedhula .......... H04L 45/18 |
| 2018/0109436 A1 | 4/2018 | Sajassi et al. |
| 2019/0052559 A1 | 2/2019 | Velayudhan et al. |
| 2023/0300065 A1* | 9/2023 | Dong ..................... H04L 45/24 |
| | | 370/389 |

OTHER PUBLICATIONS

European Patent Office. Extended European Search Report for EP Application No. 21905214.9, mailed Dec. 8, 2023, pp. 1-11.
Japan Patent Office. Notice of Reasons for Refusal for JP Application No. 2023-528519 and English translation, mailed May 2, 2024, pp. 1-8.

\* cited by examiner when it is determined that the second sub-interface is in a failed state and a main interface to which the second sub-interface belongs is in a normal state, advertise first routing information corresponding to the first sub-interface in a network, such that a third device sends a data message to the first sub-interface according to the first routing information — S100

FIG. 2 when a route withdrawal message sent by the second device is received and the route withdrawal message is only directed to the second sub-interface, determine, according to the route withdrawal message, that the second sub-interface is in the failed state and the main interface to which the second sub-interface belongs is in the normal state — S200

FIG. 3 receive a first data message sent by the third device, where the first data message carries the first routing information — S300 forward the first data message to the first sub-interface according to the first routing information and a local forwarding entry — S400

FIG. 4 acquire the first routing information from the destination address field of the first data message — S410 forward the first data message to the first sub-interface when it is determined that a next hop is the first sub-interface according to the first routing information and the local forwarding entry — S420

FIG. 5

INFORMATION PROCESSING METHOD, NODE, AND COMPUTER-READABLE STORAGE MEDIUM

CROSS-REFERENCE TO RELATED APPLICATION

This application is a national stage filing under 35 U.S.C. § 371 of international application number PCT/CN2021/121761, filed on Sep. 29, 2021, which claims priority to Chinese patent application No. 202011479889.8 filed on Dec. 15, 2020. The contents of these applications are incorporated herein by reference in their entirety.

TECHNICAL FIELD

Embodiments of the present disclosure relate to, but are not limited to, the technical field of communication technologies, and in particular, to an information processing method, a node, and a computer-readable storage medium.

BACKGROUND

In a Provider Backbone Bridge Ethernet Virtual Private Network (PBB EVPN), an Ethernet segment identifier (ESI) is configured based on a main interface of a Provider Edge (PE) router. Correspondingly, on a data plane, a Backbone Media Access Control Address (B-MAC) representing the ESI is also bound by the main interface, but actually, a sub-interface of the main interface, instead of the main interface itself, often serves as an EVPN Attachment Circuit (AC).

Because a B-MAC entry representing the ESI on the data plane is bound by the main interface, other sub-interfaces of the main interface also depend on the B-MAC entry. Moreover, sub-interface failure events often occur independently among different sub-interfaces of the same main interface. For example, when one of the sub-interfaces is shut down by an administrator, other sub-interfaces can still forward messages normally. Thus, when an individual sub-interface fails, the corresponding B-MAC entry cannot be withdrawn only due to the failure of the sub-interface. Therefore, when a destination Customer MAC (C-MAC) of a data message is associated with the B-MAC entry, the data message may still be load-shared to a PE node where the sub-interface fails, resulting in a problem of packet loss.

SUMMARY

The following is an overview of the subject matters described in detail herein. This summary is not intended to limit the protection scope of the claims.

Embodiments of the present disclosure provide an information processing method, a node, and a computer-readable storage medium.

In accordance with a first aspect of the present disclosure, an embodiment provides an information processing method, which is applied to a first device. The first device shares a dual-homing relationship with a second device. The first device is provided with a first sub-interface, and the second device is provided with a second sub-interface corresponding to the first sub-interface. The method may include the following step.

In response to a determination that the second sub-interface is in a failed state and a main interface to which the second sub-interface belongs is in a normal state, first routing information corresponding to the first sub-interface is advertised in a network, such that a third device is configured to send a data message to the first sub-interface according to the first routing information.

In accordance with a second aspect of the present disclosure, an embodiment further provides a node including a memory, a processor, and a computer program stored in the memory and executable by the processor which, when executed by the processor, causes the processor to implement the information processing method as described in the first aspect.

In accordance with a third aspect of the present disclosure, an embodiment further provides a computer-readable storage medium, storing a computer-executable instruction which, when executed by a processor, causes the processor to implement the information processing method as described above.

Other features and advantages of the present disclosure will be set forth in the description which follows and in part will become apparent from the description or may be learned from practice of the present disclosure. The objectives and other advantages of the present disclosure can be realized and attained by the structure particularly pointed out in the description, claims, and the accompanying drawings.

BRIEF DESCRIPTION OF DRAWINGS

The accompanying drawings are used to provide a further understanding of the technical scheme of the present disclosure and constitute a part of the description. The accompanying drawings, together with embodiments of the present disclosure, are used to illustrate the technical scheme of the present disclosure and do not constitute any limitation on the technical scheme of the present disclosure.

FIG. 2 is a flowchart of an information processing method according to an embodiment of the present disclosure;

FIG. 3 is a flowchart of an information processing method according to another embodiment of the present disclosure;

FIG. 4 is a flowchart of an information processing method according to another embodiment of the present disclosure;

FIG. 5 is a flowchart of forwarding a data message to a sub-interface in an information processing method according to another embodiment of the present disclosure.

DETAILED DESCRIPTION

Objectives, technical schemes, and advantages of the present disclosure will be clearer from a detailed description of embodiments of the present disclosure in conjunction with the accompanying drawings. It should be understood that the embodiments described herein are only illustrative of the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides an information processing method, a node, and a computer-readable storage medium. For a first device and a second device sharing a dual-homing relationship, the first device is provided with a first sub-interface, and the second device is provided with a second sub-interface corresponding to the first sub-interface. When the first device determines that the second sub-interface of the second device is in a failed state and a main interface to which the second sub-interface belongs is still in a normal state, the first device is configured to advertise first routing information corresponding to the first sub-interface in a network, such that a third device can send a data message to the first sub-interface of the first device according to the first routing information, thereby solving the problem of packet loss of the data message caused by failure of a sub-interface of a device in the related technologies.

The embodiments of the present disclosure are further elaborated below in conjunction with the accompanying drawings.

Figure 1:
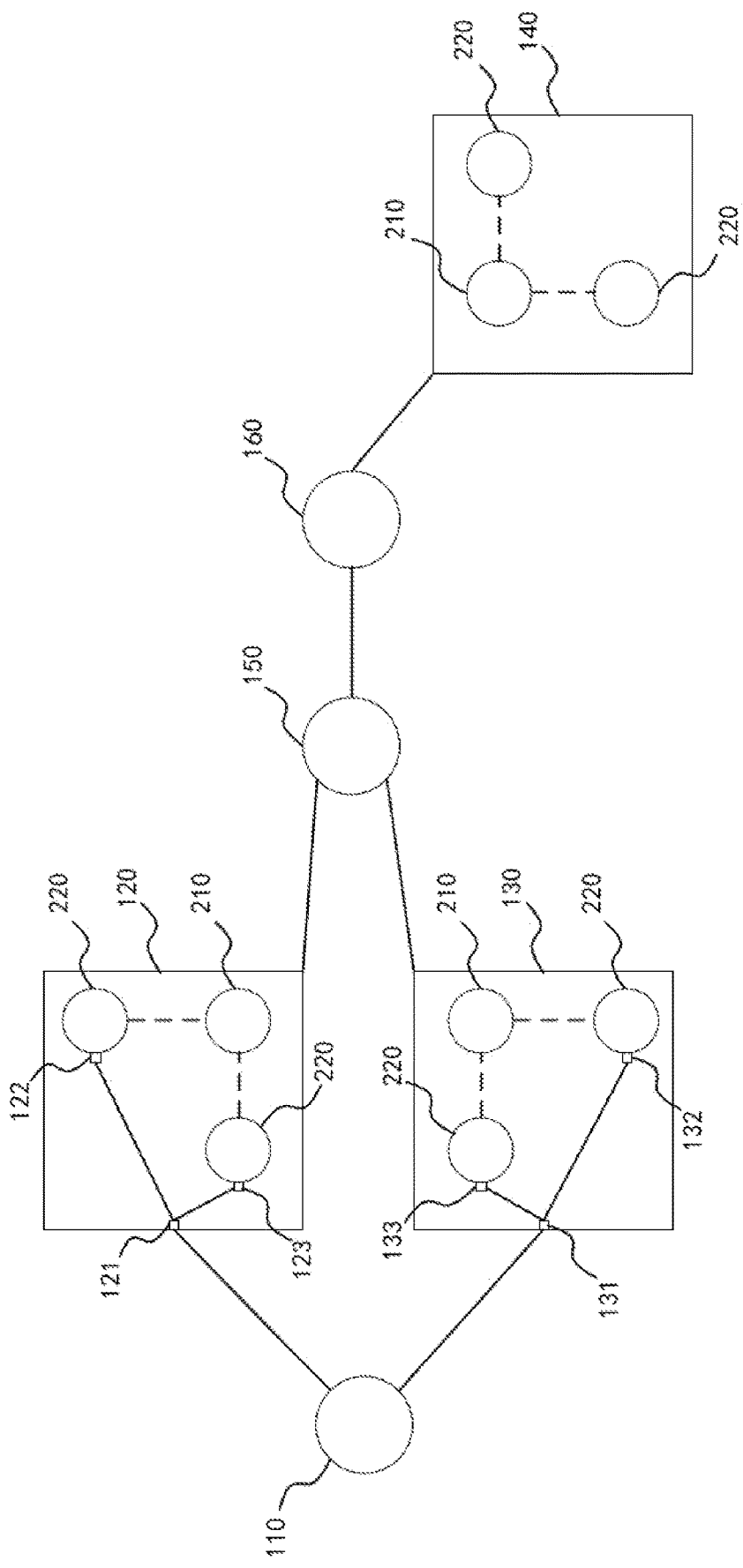
FIG. 1 is a schematic diagram of a network topology for performing an information processing method according to an embodiment of the present disclosure.

As shown in FIG. 1, FIG. 1 is a schematic diagram of a network topology for performing an information processing method according to an embodiment of the present disclosure. In an example of FIG. 1, the network topology includes a first Customer Edge (CE) 110, a first Provider Edge (PE) 120, a second PE 130, a third PE 140, a first core router 150, and a second core router 160. The first CE 110 is dual-homed to the first PE 120 and the second PE 130, which are connected to the first core router 150. The first core router 150, the second core router 160, and the third PE 140 are connected in sequence.

In the example of FIG. 1, the first PE 120, the second PE 130, and the third PE 140 all include a first functional component 210 and two second functional components 220. The first functional component 210 is connected to each of the second functional components 220. In addition, the first PE 120 further includes a first main interface 121, a first sub-interface 122, and a third sub-interface 123. Both the first sub-interface 122 and the third sub-interface 123 belong to the first main interface 121. Each of the two second functional components 220 in the first PE 120 is bound to the first sub-interface 122 or the third sub-interface 123, respectively. The second PE 130 further includes a second main interface 131, a second sub-interface 132, and a fourth sub-interface 133. Both the second sub-interface 132 and the fourth sub-interface 133 belong to the second main interface 131. Each of the two second functional components 220 of the second PE 130 is bound to the second sub-interface 132 or the fourth sub-interface 133, respectively. The first sub-interface 122 and the second sub-interface 132 are associated based on a dual-homing relationship between the first PE 120 and the second PE 130, and the third sub-interface 123 and the fourth sub-interface 133 are associated based on the dual-homing relationship between the first PE 120 and the second PE 130.

It is to be noted that the first sub-interface 122 and the second sub-interface 132 can receive messages with identical Virtual Local Area Network (VLAN) encapsulation, and the third sub-interface 123 and the fourth sub-interface 133 can receive messages with identical VLAN encapsulation.

In each PE, corresponding routing information is assigned to the main interface and the sub-interfaces. The routing information may be an Internet Protocol (IP) address, a Media Access Control Address (MAC), or an Ethernet Segment Identifier (ESI), or the like, which is not limited herein. It is to be noted that a plurality of sub-interfaces associated due to the dual-homing relationship between the devices, for example, the first sub-interface 122 of the first PE 120 and the second sub-interface 132 of the second PE 130, have identical routing information.

The second functional component 220 is a service instance for forwarding data messages according to C-MAC. The second functional component 220 may use VXLAN, PBB, MPLS, SRv6, and other encapsulation formats to forward data messages between PEs. In this case, the second functional component 220 may be called a VXLAN EVPN instance, a PBB EVPN instance, an MPLS EVPN instance, an SRv6 EVPN instance, or the like.

The first functional component 210 is configured to bear the service instance (corresponding to the second functional component 220). In addition, the first functional component 210 may be configured to advertise routing information corresponding to the main interface or routing information corresponding to the sub-interfaces in the network. It is to be noted that, when both the first PE 120 and the second PE 130 having a dual-homing relationship operate normally, the first functional component 210 in the first PE 120 and the first functional component 210 in the second PE 130 may be configured to only advertise the routing information corresponding to the main interface in the network. When a sub-interface in the first PE 120 is in a failed state, the routing information corresponding to the sub-interface in the second PE 130 corresponding to the failed sub-interface of the first PE 120 will be advertised in the network by the first functional component 210 in the second PE 130. When a sub-interface in the second PE 130 is in a failed state, the routing information corresponding to the sub-interface in the first PE 120 corresponding to the failed sub-interface of the second PE 130 can be advertised in the network by the first functional component 210 in the first PE 120. It is to be noted that, if the first PE 120 determines that the main interface of the second PE 130 is in a failed state, the first functional component 210 in the first PE 120 will be configured to not advertise the routing information of the sub-interface of the first PE 120 in the network. If the second PE 130 determines that the main interface of the first PE 120 is in a failed state, the first functional component 210 in the second PE 130 will be configured to not advertise the routing information of the sub-interface of the second PE 130 in the network, either.

The network typology and the application scenario described in the embodiments of the present disclosure are used to illustrate the technical schemes of the embodiments of the present disclosure more clearly, and do not constitute any limitation on the technical schemes provided in the embodiments of the present disclosure. Those having ordinary skills in the art may know that, with the evolution of the network topology and the emergence of new application scenarios, the technical schemes provided in the embodiments of the present disclosure can also be applied to similar technical problems.

It can be understood by those having ordinary skills in the art that the topology shown in FIG. 1 does not constitute a limitation on the embodiments of the present disclosure, and there may be more or fewer components than those shown in the figure, or some components may be combined, or a different component arrangement may be used.

Various embodiments of the information processing method of the present disclosure are proposed based on the structure of the above network topology.

As shown in FIG. 2, FIG. 2 is a flowchart of an information processing method according to an embodiment of the present disclosure. The information processing method is applied to a first device (e.g., the first PE 120 in the network topology shown in FIG. 1). The first device and a second device (e.g., the second PE 130 in the network topology shown in FIG. 1) have a dual-homing relationship, and are in an identical Ethernet Segment (ES). The first device is provided with a first sub-interface, and the second device is provided with a second sub-interface corresponding to the first sub-interface. The information processing method includes, but not limited to, a following step.

At a step of S100, when it is determined that the second sub-interface is in a failed state and a main interface to which the second sub-interface belongs is in a normal state, first routing information corresponding to the first sub-interface is advertised in a network, such that a third device sends a data message to the first sub-interface according to the first routing information.

It is to be noted that the first routing information corresponding to the first sub-interface may be an IP address, a B-MAC address, or other custom identifiers that can uniquely identify the first sub-interface on the data plane, which is not limited herein.

When the first device determines that the second sub-interface of the second device is in the failed state and the main interface to which the second sub-interface belongs is in the normal state, it indicates that other sub-interfaces of the second device can still operate normally, but the second sub-interface can no longer forward data messages. However, because all the sub-interfaces of the second device are associated with a B-MAC entry bound to same main interface and the B-MAC entry cannot be withdrawn only due to failure of the second sub-interface, if the third device still sends a data message according to routing information corresponding to the main interface, the data message will be distributed to the second sub-interface of the second device, causing the problem of packet loss. In order to solve the above problem without affecting the normal forwarding of the data message by the first sub-interface of the first device, when the first device determines that the second sub-interface is in the failed state and the main interface to which the second sub-interface belongs is in the normal state, the first routing information corresponding to the first sub-interface is advertised in the network. After receiving the first routing information, the third device can accurately send the data message to the first sub-interface according to the first routing information, ensuring the normal forwarding of the data message by the first sub-interface of the first device. In addition, because the second device will not issue the routing information corresponding to the second sub-interface, the problem of packet loss caused by the sending of the data message to the second sub-interface of the second device is also prevented.

It is to be noted that, when the problem of packet loss caused by the third device sending the data message to the failed second sub-interface arises, a packet loss result can be optimized to a result of making a detour to other nodes through an egress link protection technology. However, long-time detouring can still waste a network bandwidth. In this case, according to this embodiment, detouring of the data message can be quickly removed prior to recovery of the second sub-interface, thereby saving network bandwidth resources. For this embodiment, the technical effect of solving the problem of packet loss and removing the detouring of the data message may be based on the identical technical means, and it is determined, based on whether to be combined with other technical means, whether to implement the detouring.

It is to be noted that the first device is configured to advertise the first routing information corresponding to the first sub-interface in the network only when it is determined that the second sub-interface is in the failed state and the main interface to which the second sub-interface belongs is in the normal state. In other words, when both the first device and the second device are in a normal operating state, it is unnecessary for the first device to advertise the first routing information corresponding to the first sub-interface. In addition, when the second sub-interface is in the failed state, the first device sends the first routing information only for the first sub-interface corresponding to the second sub-interface, and will not send the routing information for all the sub-interfaces. Moreover, the second device may not advertise the routing information corresponding to the second sub-interface. Therefore, a quantity of routing information issued for the sub-interfaces in the network can be reduced, thereby reducing the routing pressure on the network, especially in the normal state (e.g., before any sub-interface on the ES fails), no routing information (e.g., routing information having the same nature as the first routing information) specific to any sub-interface on the ES is issued to the outside of the ES (e.g., the third device).

In an embodiment, the first routing information includes a common routing part corresponding to routing information of a main interface to which the first sub-interface belongs, and an unique routing part for distinguishing sub-interfaces belonging to the main interface.

In an embodiment, the first routing information may be formed by a high-bit common routing part and a low-bit unique routing part. The common routing part may be an IPv6 prefix or other custom identifiers that can uniquely identify the main interface on the data plane. A bit length of the common routing part may be appropriately selected according to an actual application. The unique routing part may be a globally unique EVPN Global Discriminator (EGD), a local discriminator or other custom identifiers that can be used for distinguishing sub-interfaces in the network. A bit length of the unique routing part may be appropriately selected according to an actual application. Specific content of both the common routing part and the unique routing part can be appropriately selected according to actual applications, which is not limited herein. For example, when the first routing information is an IPv6 address, high 104 bits of the first routing information are the common routing part which is an IPv6 prefix, while low 24 bits of the first routing information are the unique routing part which is an EGD.

It is to be noted that, when there is only one sub-interface in an identical EVPN instance corresponding to identical first routing information (such as ESI), the unique routing part may be an EGD which can uniquely identify the sub-interface.

It is to be noted that, when the first functional component 210 of the first device carries an SRv6 EVPN instance, the first routing information corresponding to the first sub-interface is formed by the common routing part and the unique routing part described above. In this case, the routing information corresponding to the main interface includes only the common routing part without the unique routing part. When the first functional component of the first device carries an IP-VRF instance, both the first routing information corresponding to the first sub-interface and the routing information corresponding to the main interface are IP routes of the IP-VRF instance. In this case, the unique routing part of the first routing information corresponding to the first sub-interface only needs to include a marker that can uniquely identify the first sub-interface, which may be, for example, an interface discriminator that can uniquely identify the first sub-interface within an ES to which the first device belongs. A specific value of the interface discriminator may be appropriately selected according to an actual application (e.g., VLAN identifier information of the sub-interface may be selected, or the like), which is not limited herein. When the EGD is transmitted in another field (such as a VNI field) such that it is unnecessary for the unique routing part of the first routing information corresponding to the first sub-interface to include the EGD, the first routing information based on the interface discriminator may be used, thereby allowing the routing information corresponding to the main interface to have more significant bits, so as to be more suitable for applications of devices that do not support IPv6.

In addition, in an embodiment, as shown in FIG. 3, the information processing method may further include, but not limited to, a following step.

At a step of S200, when a route withdrawal message sent by the second device is received and the route withdrawal message is only directed to the second sub-interface, it is determined, according to the route withdrawal message, that the second sub-interface is in the failed state but the main interface to which the second sub-interface belongs is in the normal state.

It is to be noted that, prior to the step of S100, if the first device receives the route withdrawal message sent by the second device and the route withdrawal message is only directed to the second sub-interface, the first device can determine that the second sub-interface is in the failed state. In this case, if a route corresponding to the main interface to which the second sub-interface belongs has not been withdrawn, that is, the main interface to which the second sub-interface belongs is in the normal state. Therefore, the operation of advertising the first routing information corresponding to the first sub-interface in a network can be triggered.

It is to be noted that, when a sub-interface or a main interface of a PE fails in the network, a route withdrawal message will be flooded in the network. There are two types of route withdrawal messages, namely, a route withdrawal message corresponding to the route of the main interface (such as an RT-1 per ES route) and a route withdrawal message corresponding to the route of the sub-interface (such as an RT-1 per EVI route). When a sub-interface of the PE fails, the PE floods the route withdrawal message corresponding to the sub-interface in the network. When the main interface of the PE fails, the PE floods the route withdrawal message corresponding to the main interface and the route withdrawal message corresponding to the sub-interface in the network. When the first device receives the route withdrawal message corresponding to the sub-interface (i.e., the route withdrawal message is only directed to the second sub-interface), it indicates that only the second sub-interface of the second device is in the failed state while other sub-interfaces of the second device are all in a normal operating state. Therefore, the first device can determine that the second sub-interface is in the failed state and the main interface to which the second sub-interface belongs is in the normal state. When the first device receives the route withdrawal message corresponding to the main interface (i.e., the route withdrawal message is directed to the main interface), it indicates that the main interface of the second device and all sub-interfaces subordinate to the main interface are in the failed state. Therefore, the first device can determine that the main interface on the second device has failed. It is to be noted that, when the main interface on the second device has failed, that is, the second device has no effect on the main interface in the network, a starting node (such as the third device) sending a data message may be configured to delete the routing information corresponding to the main interface of the second device. Therefore, the starting node sending a data message neither selects the second device as a destination node, nor arranges the second device in a forwarding path. Therefore, it is unnecessary for the first device to trigger the operation of advertising the first routing information corresponding to the first sub-interface in a network, which will not lead to the problem of detour or packet loss of the data message.

It is to be noted that the route withdrawal message in this embodiment may be any routing message that can advertise the failed state of the corresponding first routing information, and be unnecessary to be related to an MP_UN-REACH_NLRI attribute in a Border Gateway Protocol (BGP).

In addition, in an embodiment, the advertising first routing information corresponding to the first sub-interface in a network in the step S100 may include, but not limited to the following step.

A BGP routing message is flooded in the network to advertise the first routing information corresponding to the first sub-interface. The BGP routing message includes the first routing information, and a first device identifier for identifying the first device and enabling the third device to use a first Segment Identifier (SID) list to carry the first routing information and the first device identifier when sending the data message. A processing logical position of the first routing information in the first SID list is behind a processing logical position of the first device identifier in the first SID list.

It is to be noted that the first device identifier is used for uniquely identifying an address of the first device, and a value of the first device identifier may be appropriately selected according to an actual application, which is not limited herein.

It is to be noted that, when the first device (e.g., the first PE 120 in FIG. 1) floods the first routing information corresponding to the first sub-interface in the network, for example, floods the first routing information using an Interior Gateway Protocol (IGP), the core routers (e.g., the first core router 150 and the second core router 160 in FIG. 1) in the network may perceive the first routing information. In this case, routing pressure on the core routers increases. In order to prevent the core routers from perceiving the first routing information and achieve the purpose of light weight, in this embodiment, the first routing information corresponding to the first sub-interface is flooded using the BGP routing message, so as to prevent the core routers from perceiving the first routing information.

It is to be noted that, when the first routing information corresponding to the first sub-interface is flooded using the BGP routing message, the first device identifier for identifying the first device may also be carried in the BGP routing message. After the third device receives the BGP routing message, the third device can acquire the first device identifier corresponding to the first device and the first routing information corresponding to the first sub-interface. When the third device needs to send the data message to the first sub-interface of the first device, the third device may use the first SID list to carry the first routing information and the first device identifier. In addition, in the first SID list, an SID where the first routing information is located is in an inner layer of an SID where the first device identifier is located. Therefore, during the transmission of the data message from the third device to the first device, the first routing information is hidden in a Segment Routing Header (SRH) corresponding to the first SID list, so that the core router cannot perceive the first routing information, and the first routing information will be exposed only after the data message reaches the first device. In other words, it is unnecessary for the first device to advertise the first routing information to the core router when flooding the first routing information. Therefore, the first device can use the BGP routing message to flood the first routing information corresponding to the first sub-interface to reduce the routing pressure on the core router and achieve the purpose of light weight.

It is to be noted that, when the first routing information is flooded using the BGP routing message, the first routing information may be routing information in a global routing table, an IP-VRF instance, or an MAC-VRF instance. At the same time, the first routing information and the routing information of the main interface are routing information in the same routing table.

It is to be noted that the BGP routing message may also include bandwidth information for enabling the third device to determine the first device identifier according to the bandwidth information.

It is to be noted that the bandwidth information in the BGP routing message reflects a bandwidth processing capability of the device advertising the BGP routing message. Therefore, after the third device receives the BGP routing message with the bandwidth information from each device, when the third device sends the data message, the third device may first perform load sharing among a plurality of devices corresponding to target routing information according to bandwidth information advertised by the devices, determine a final device identifier according to load sharing results, and then use the determined final device identifier as a destination address to forward the data message. For example, assuming that the bandwidth information of the first device indicates that the first device has the highest bandwidth processing capability, after the third device receives the BGP routing message carrying the first routing information and the bandwidth information, when the third device needs to forward the data message according to the first routing information, the third device may first perform load sharing between the first device and the second device corresponding to the first routing information proportionally according to the bandwidth information advertised by the first device and the second device. Because the first device has the highest bandwidth processing capability, a load sharing result will be that the first device shares a larger amount of data forwarding. Therefore, the third device selects the first device identifier for identifying the first device as the destination address to forward the data message to the first device.

In addition, in an embodiment, as shown in FIG. 4, the information processing method may further include, but not limited to, following steps.

At a step of S300, a first data message sent by the third device is received, where the first data message carries the first routing information.

At a step of S400, the first data message is forwarded to the first sub-interface according to the first routing information and a local forwarding entry.

It is to be noted that, after the first device advertises the first routing information corresponding to the first sub-interface in the network and the third device receives the first routing information, the third device may be configured to send the first data message carrying the first routing information to the first device according to the first routing information. The first device, after receiving the first data message, may be configured to forward the first data message to the first sub-interface according to the first routing information in the first data message and the local forwarding entry, thereby realizing service transmission from the third device to the first device.

It is to be noted that a message format of the first data message may have different types. For example, the first data message may be an SRv6 message type, a Multi-Protocol Label Switching (MPLS) message type, or the like, which is not limited herein. It is to be noted that, due to different message formats of the first data message, the local forwarding entry may also have different types. For example, when the first data message is an SRv6 message type, the local forwarding entry is a local segment identifier forwarding entry, and when the first data message is an MPLS message type, the local forwarding entry is a label forwarding entry.

In addition, in an embodiment, the first data message sent by the third device may also carry first MAC information which is MAC information of a destination node (e.g., the first CE 110 in FIG. 1) that the first data message needs to reach (i.e., destination MAC information). In this case, prior to the step of S100 or prior to the step of S300, the information processing method may include, but not limited to, the following step.

A second data message carrying the first routing information and second MAC information identical to the first MAC information are sent to the third device, so that the third device constructs the first data message according to the first routing information and the second MAC information in the second data message.

It is to be noted that, before the third device sends the first data message to the first device, the first device may send the second data message to the third device. The second data message carries the first routing information and the second MAC information which is MAC information of a user equipment (e.g., the first CE 100 in FIG. 1) (i.e., source MAC information of the user equipment). The third device, after receiving the second data message, can learn from the second data message and save a relationship between the first routing information and the second MAC information. Therefore, when the third device needs to send a data message to the user equipment (e.g., the first CE 100 in FIG. 1), the saved second MAC information can be obtained according to destination address information (i.e., the first MAC information), and address information of the first device (e.g., the first device identifier) in the forwarding path can be obtained according to the relationship between the second MAC information and the first routing information. Then, the first data message can be constructed according to the first MAC address information and the first routing information, as shown in the embodiment of FIG. 4.

It is to be noted that, when the first routing information is an IPv6 address, since the IPv6 address has a feature of longest matching, the step in this embodiment may be performed prior to the step of S100.

It is to be noted that, when other second routing information (e.g., an SID of a VNI or End. DT2U type) enabling the first device to determine an EVPN instance (i.e., a service instance corresponding to the second functional component) to which the first data message belongs can be acquired according to the first routing information, the third device may also replace the first routing information with the second routing information. In this case, the first device also needs to use the first MAC address to determine that an egress of the first data message is the first sub-interface.

In addition, in an embodiment, the first routing information is filled in a destination address field of the first data message. In this case, as shown in FIG. 5, the step of S400 may include, but not limited to, the following steps.

At a step of S410, the first routing information is acquired from the destination address field of the first data message.

At a step of S420, the first data message is forwarded to the first sub-interface when it is determined that a next hop is the first sub-interface according to the first routing information and the local forwarding entry.

It is to be noted that, after the first device receives the first data message from the third device, the first device is configured to first acquire information of the destination address field in the first data message, and then determine whether the information in the destination address field hits the local forwarding entry. When the information in the destination address field hits the local forwarding entry, related processing may be performed on the first data message according to relevant information recorded in the local forwarding entry. Therefore, in this embodiment, the first device, after receiving the first data message, is configured to first acquire the first routing information from the destination address field of the first data message, then determine whether the first routing information hits the local forwarding entry, and when it is determined that the first routing information hits the local forwarding entry and that a next hop is the first sub-interface according to the hit local forwarding entry, forward the first data message to the first sub-interface, thereby realizing the related processing on the first data message.

It is to be noted that, in some cases, a determination that the next hop of the first data message is the first sub-interface is made according to a destination MAC address of the first data message in addition to the first routing information. For example, when the unique part of the first routing information is EGD and the ESI has a plurality of sub-interfaces in the EVPN instance identified by the EGD, because the sub-interfaces use identical first routing information, selection has to be made among the sub-interfaces additionally through destination MAC addresses.

Figure 6:
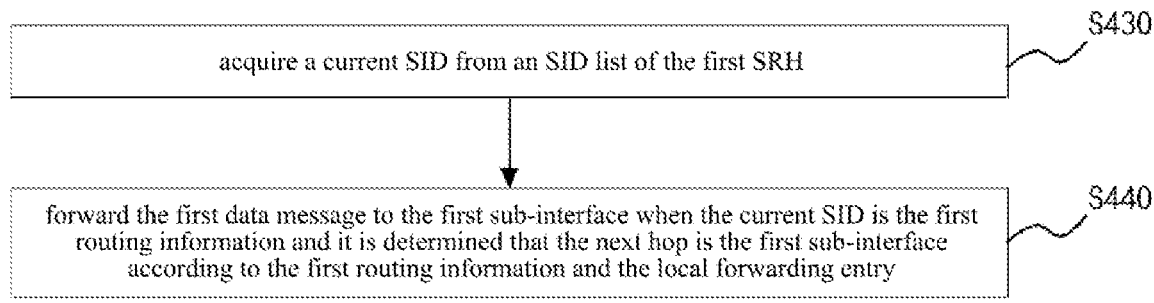
FIG. 6 is a flowchart of forwarding a data message to a sub-interface in an information processing method according to another embodiment of the present disclosure.

In addition, in an embodiment, when the first data message includes a first SRH which carries the first routing information, as shown in FIG. 6, the step of S400 may further include, but not limited to, the following steps.

At a step of S430, a current SID is acquired from an SID list of the first SRH.

At a step of S440, the first data message is forwarded to the first sub-interface when the current SID is the first routing information and it is determined that the next hop is the first sub-interface according to the first routing information and the local forwarding entry.

It is to be noted that, the embodiment shown in FIG. 6 and the embodiment shown in FIG. 5 are parallel technical schemes, and have the following differences that in the embodiment shown in FIG. 5, the SRH is not encapsulated in the first data message, and the first routing information is filled in the destination address field of the first data message; while in the embodiment shown in FIG. 6, the first SRH is encapsulated in the first data message, and the first routing information is filled in the first SRH.

It is to be noted that, when the first SRH is encapsulated in the first data message, after the first device receives the first data message from the third device, the first device is configured to first determine whether the information of the destination address field in the first data message matches the device. If so, the first device is configured to acquire the current SID from the SID list of the first SRH, and then determine whether the current SID hits the local forwarding entry. If the current SID hits the local forwarding entry, related processing can be performed on the first data message according to relevant information recorded in the local forwarding entry. Therefore, in this embodiment, when the first device determines that the information of the destination address field in the first data message matches the device, the first device is configured to acquire the current SID from the SID list of the first SRH of the first data message. When the current SID is the first routing information, and it is determined that the first routing information hits the local forwarding entry, and that the next hop is the first sub-interface according to the hit local forwarding entry, the first data message can be forwarded to the first sub-interface, thereby realizing the related processing on the first data message.

In addition, an embodiment of the present disclosure further provides a node including a memory, a processor, and a computer program stored in the memory and executable by the processor.

The processor and the memory may be connected through a bus or by other means.

As a non-transient computer-readable storage medium, the memory may be configured to store non-transient software programs and non-transient computer-executable programs. In addition, the memory may include a high-speed random access memory, and may also include a non-transient memory, such as at least one disk memory device, a flash memory device, or other non-transient solid-state memory devices. In some embodiments, the memory includes memories remotely located with respect to the processor which may be connected to the processor via networks. Examples of the networks above include, but are not limited to, the Internet, an intranet, a local area network, a mobile communication network, and combinations thereof.

It is to be noted that, the node in this embodiment may be applied as the first PE 120 or the second PE 130 in the network topology of the embodiment shown in FIG. 1, that is, both the node in this embodiment and the first PE 120 or the second PE 130 in the network topology of the embodiment shown in FIG. 1 share an identical inventive concept, so these embodiments have the identical implementation principles and technical effects. Details are not described herein again.

Non-transient software programs and instructions required to implement the information processing method in the foregoing embodiments are stored in the memory which, when executed by the processor, cause the processor to implement the information processing method in the foregoing embodiments, for example, implement the step of S100 of the method in FIG. 2, the step of S200 of the method in FIG. 3, the steps S300 to S400 of the method in FIG. 4, the steps S410 to S420 of the method in FIG. 5, and the steps S430 to S440 of the method in FIG. 6 described above.

The embodiments of the node described above are merely illustrative. The units described as separate components may or may not be physically separated, that is, they may be located in one place or distributed across a plurality of network units. Part or all of the modules may be selected according to actual needs to achieve the objective of the technical scheme of the embodiment.

In addition, an embodiment of the present disclosure further provides a computer-readable storage medium, storing a computer-executable instruction which, when executed by a processor or a controller, for example, by the processor in the foregoing embodiments of the node, causes the processor to implement the information processing method in the foregoing embodiments, for example, implement the step of S100 of the method in FIG. 2, the step of S200 of the method in FIG. 3, the steps S300 to S400 of the method in FIG. 4, the steps S410 to S420 of the method in FIG. 5, and the steps S430 to S440 of the method in FIG. 6 described above.

In embodiments of the present disclosure, for a first device having a first sub-interface and sharing a dual-homing relationship with a second device, the second device is provided with a second sub-interface corresponding to the first sub-interface. When the first device determines that the second sub-interface of the second device is in a failed state and a main interface to which the second sub-interface belongs is in a normal state, the first device is configured to advertise first routing information corresponding to the first sub-interface in a network, such that a third device is configured to send a data message to the first sub-interface according to the first routing information. According to the scheme provided in the embodiments of the present disclosure, when the first device determines that the second sub-interface of the second device is in a failed state and a main interface to which the second sub-interface belongs is still in a normal state, the first device is configured to advertise the first routing information corresponding to the first sub-interface in the network, such that a third device can send a data message to the first sub-interface of the first device according to the first routing information, thereby solving the problem of packet loss of the data message caused by failure of a sub-interface of a device in the existing technologies.

Those having ordinary skills in the art can understand that all or some of the steps and systems in the methods disclosed above may be implemented as software, firmware, hardware, and suitable combinations thereof. Some physical components or all physical components may be implemented as software executed by a processor, such as a central processing unit, a digital signal processor or a microprocessor, or implemented as hardware, or implemented as an integrated circuit, such as an application-specific integrated circuit. Such software may be distributed on a computer-readable medium. The computer-readable medium may include a computer storage medium (or non-transitory medium) and a communication medium (or transitory medium). As is well known to those having ordinary skills in the art, the term "computer storage medium" includes volatile and non-volatile, removable and non-removable media implemented in any method or technology for storing information (such as computer-readable instructions, data structures, computer program modules or other data). The computer storage medium includes, but not limited to, Random-Access Memory (RAM), Read-Only Memory (ROM), Electrically Erasable Programmable Read-Only Memory (EEPROM), flash memory, or other memory technologies, Compact Disc Read-Only Memory (CD-ROM), Digital Versatile Disc (DVD) or another optical disc storage, magnetic cassette, magnetic tape, disk storage or another magnetic storage apparatus, or any other medium that can be used for storing desired information and can be accessed by a computer. Moreover, it is well known to those having ordinary skills in the art that the communication medium typically includes computer-readable instructions, data structures, program modules, or other data in a modulated data signal, such as a carrier wave or other transmission mechanisms, and may include any information delivery medium.

The foregoing describes embodiments of the present disclosure in detail, but the present disclosure is not limited thereto. Those having ordinary skills in the art can make various equal variations or replacements without departing from the protection scope of the embodiments of the present disclosure, and these equal variations or replacements shall all fall within the protection scope defined by the claims of the present disclosure.

What is claimed is:

1. An information processing method applied to a first device sharing a dual-homing relationship with a second device, the first device being provided with a first sub-interface, the second device being provided with a second sub-interface corresponding to the first sub-interface, the method comprising:
in response to determining that the second sub-interface is in a failed state and a main interface to which the second sub-interface belongs is in a normal state, advertising first routing information corresponding to the first sub-interface in a network, such that a third device is configured to send a data message to the first sub-interface according to the first routing information.

2. The method of claim 1, wherein the first routing information comprises a common routing part corresponding to routing information of a main interface to which the first sub-interface belongs, and a unique routing part for distinguishing sub-interfaces belonging to the main interface.

3. The method of claim 1, further comprising:
in response to receiving a route withdrawal message which is sent by the second device and only directed to the second sub-interface, determining, according to the route withdrawal message, that the second sub-interface is in the failed state and the main interface to which the second sub-interface belongs is in the normal state.

4. The method of claim 1, wherein advertising first routing information corresponding to the first sub-interface in a network comprises:
flooding a Border Gateway Protocol (BGP) routing message in a network to advertise the first routing information corresponding to the first sub-interface, wherein the BGP routing message comprises the first routing information and a first device identifier for identifying the first device, the first device identifier being used for enabling a first Segment Identifier (SID) list to carry the first routing information and the first device identifier in response to the third device sending the data message, and a processing logical position of the first routing information in the first SID list is behind a processing logical position of the first device identifier in the first SID list.

5. The method of claim 4, wherein the BGP routing message further comprises bandwidth information for enabling the third device to determine the first device identifier according to the bandwidth information.

6. The method of claim 1, further comprising:
receiving a first data message sent by the third device, wherein the first data message carries the first routing information; and
forwarding the first data message to the first sub-interface according to the first routing information and a local forwarding entry.

7. The method of claim 6, wherein the first data message further carries first Media Access Control (MAC) address information, and prior to advertising first routing information corresponding to the first sub-interface in a network or prior to receiving a first data message sent by the third device, the method further comprises:
sending a second data message carrying the first routing information and second MAC address information identical to the first MAC address information to the third device, such that the third device is configured to construct the first data message according to the first routing information and the second MAC address information in the second data message.

8. The method of claim 6, wherein the first routing information is filled in a destination address field of the first data message, and forwarding the first data message to the first sub-interface according to the first routing information and a local forwarding entry comprises:
acquiring the first routing information from the destination address field of the first data message; and
forwarding the first data message to the first sub-interface in response to a determination that a next hop is the first sub-interface according to the first routing information and the local forwarding entry.

9. The method of claim 6, wherein the first data message comprises a first Segment Routing Header (SRH) carrying the first routing information, and forwarding the first data message to the first sub-interface according to the first routing information and a local forwarding entry comprises:
acquiring a current SID from an SID list of the first SRH; and
forwarding the first data message to the first sub-interface, in response to the current SID being the first routing information and a determination that the next hop is the first sub-interface according to the first routing information and the local forwarding entry.

10. A first node, comprising a memory, a processor, and a computer program stored in the memory and executable by the processor which, when executed by the processor, causes the processor to perform an information processing method, the first node sharing a dual-homing relationship with a second node, the first node being provided with a first sub-interface, the second node being provided with a second sub-interface corresponding to the first sub-interface, the information processing method comprising:
in response to determining that the second sub-interface is in a failed state and a main interface to which the second sub-interface belongs is in a normal state, advertising first routing information corresponding to the first sub-interface in a network, such that a third node is configured to send a data message to the first sub-interface according to the first routing information.

11. The first node of claim 10, wherein the first routing information comprises a common routing part corresponding to routing information of a main interface to which the first sub-interface belongs, and a unique routing part for distinguishing sub-interfaces belonging to the main interface.

12. The first node of claim 10, wherein the information processing method further comprising:
in response to receiving a route withdrawal message which is sent by the second node and only directed to the second sub-interface, determining, according to the route withdrawal message, that the second sub-interface is in the failed state and the main interface to which the second sub-interface belongs is in the normal state.

13. The first node of claim 10, wherein advertising first routing information corresponding to the first sub-interface in a network comprises:
flooding a Border Gateway Protocol (BGP) routing message in a network to advertise the first routing information corresponding to the first sub-interface, wherein the BGP routing message comprises the first routing information and a first device identifier for identifying the first node, the first device identifier being used for enabling a first Segment Identifier (SID) list to carry the first routing information and the first device identifier in response to the third node sending the data message, and a processing logical position of the first routing information in the first SID list is behind a processing logical position of the first device identifier in the first SID list.

14. The first node of claim 13, wherein the BGP routing message further comprises bandwidth information for enabling the third node to determine the first device identifier according to the bandwidth information.

15. The first node of claim 10, wherein the information processing method further comprising:
receiving a first data message sent by the third node, wherein the first data message carries the first routing information; and
forwarding the first data message to the first sub-interface according to the first routing information and a local forwarding entry.

16. A non-transitory computer-readable storage medium, storing a computer-executable instruction which, when executed by a processor, causes the processor to perform an information processing method applied to a first device sharing a dual-homing relationship with a second device, the first device being provided with a first sub-interface, the second device being provided with a second sub-interface corresponding to the first sub-interface, the method comprising:
in response to determining that the second sub-interface is in a failed state and a main interface to which the second sub-interface belongs is in a normal state, advertising first routing information corresponding to the first sub-interface in a network, such that a third node is configured to send a data message to the first sub-interface according to the first routing information.

17. The non-transitory computer-readable storage medium of claim 16, wherein the first routing information comprises a common routing part corresponding to routing information of a main interface to which the first sub-interface belongs, and a unique routing part for distinguishing sub-interfaces belonging to the main interface.

18. The non-transitory computer-readable storage medium of claim 16, wherein the information processing method further comprising:
in response to receiving a route withdrawal message which is sent by the second device and only directed to the second sub-interface, determining, according to the route withdrawal message, that the second sub-interface is in the failed state and the main interface to which the second sub-interface belongs is in the normal state.

19. The non-transitory computer-readable storage medium of claim 16, wherein advertising first routing information corresponding to the first sub-interface in a network comprises:
flooding a Border Gateway Protocol (BGP) routing message in a network to advertise the first routing information corresponding to the first sub-interface, wherein the BGP routing message comprises the first routing information and a first device identifier for identifying the first device, the first device identifier being used for enabling a first Segment Identifier (SID) list to carry the first routing information and the first device identifier in response to the third device sending the data message, and a processing logical position of the first routing information in the first SID list is behind a processing logical position of the first device identifier in the first SID list.

20. The non-transitory computer-readable storage medium of claim 16, wherein the information processing method further comprising:
receiving a first data message sent by the third device, wherein the first data message carries the first routing information; and
forwarding the first data message to the first sub-interface according to the first routing information and a local forwarding entry.

* * * * *